United States Patent [19]

Oldack

[11] 4,379,095

[45] Apr. 5, 1983

[54] METHOD FOR REDUCING THE MECHANICAL STABILITY OF NATURAL RUBBER LATEX

[75] Inventor: Richard C. Oldack, Uniontown, Ohio

[73] Assignee: The Firestone Tire & Rubber Company, Akron, Ohio

[21] Appl. No.: 349,184

[22] Filed: Feb. 17, 1982

Related U.S. Application Data

[63] Continuation of Ser. No. 158,959, Jun. 12, 1980, abandoned.

[51] Int. Cl.$^3$ .............................................. C08L 7/02
[52] U.S. Cl. ................................. 260/815; 260/821; 260/822; 523/335; 524/376; 524/377
[58] Field of Search ....................... 260/815, 821, 822; 523/335

[56] References Cited

U.S. PATENT DOCUMENTS

| 3,006,872 | 10/1961 | Benedict et al. | 260/3 |
| 3,249,569 | 5/1966 | Fantl | 260/29.6 |
| 3,878,152 | 4/1975 | Distler et al. | 260/29.6 |

FOREIGN PATENT DOCUMENTS 146350  3/1949  Australia .

OTHER PUBLICATIONS

T. D. Pendle and A. D. T. Gordon, "The Mechanical Stability of Natural Rubber Latexes", *Rubber Chemistry and Technology*, vol. 51, p. 986.

*Primary Examiner*—Morton Foelak
*Attorney, Agent, or Firm*—Daniel N. Hall

[57] ABSTRACT

A method is provided for the mechanical destabilization of natural rubber latex by the addition of a nonionic polyol block copolymer surfactant. Reducing the mechanical stability allows the natural rubber latex composition to form better quick-break adhesives.

4 Claims, No Drawings

METHOD FOR REDUCING THE MECHANICAL STABILITY OF NATURAL RUBBER LATEX

This application is a continuation of application Ser. No. 158,959, filed June 12, 1980, abandoned.

TECHNICAL FIELD

The present invention is directed toward a method for the controlled reduction of mechanical stability in natural rubber latex. Mechanical destabilization of natural rubber latex is important when the latex is employed as a quick-break adhesive or caulking compound. Quick-break adhesives are utilized in light duty applications such as the bonding of insoles and labels into shoes.

The primary requirement of such an adhesive is that it form a bond rapidly under normal finger pressure but not so rapidly as to impair positioning. The bond forms initially by destabilization of the latex to form a film and subsequently increases its strength by drying. A most important characteristic then of the quick-break adhesive is its mechanical stability which must be low enough to permit finger-pressure sensitivity. Destabilization depends primarily on the loss of water from the latex to the substrate which, in turn, is related to the water content of the adhesive; higher water content requiring greater pressure for grab. However, for processing considerations, mechanical stability cannot be sufficiently reduced merely by reducing the water content of the latex.

BACKGROUND ART

Mechanical destabilization of natural rubber latex adhesive formulations has been accomplished heretofore, with the use of hydrocarbon solvents, such as toluene. Solvents cause swelling which thin out the protective coating of surfactants after which the rubber molecules can easily make contact under finger-pressure and conglomerate, forming the adhesive bond. However, the use of solvents is not as desirable as it once had been considering the potential and real effects solvents have on the worker and the environment, both of which necessitate costly safeguards.

Mechanical destabilization of natural rubber has also been observed following the addition of an ethoxylated alcohol, T. D. Pendle, A. D. T. Gordon "The Mechanical Stability of Natural Rubber Latexes" *Rubber Chemistry and Technology*, Vol. 51, p. 986. The observation of the authors was that nonionic surfactants, added to latex mixes to confer chemical stability not attainable by the use of fatty acid soaps, had different effects upon the mechanical stability which effects were very dependent upon molecular structure of the surfactant. Octylcresol ethoxylates increased mechanical stability while tridecanol ethoxylates decreased mechanical stability.

It is also known in the art to reduce chemical stability of the latex primarily in order to form gelled film during latex dipping operations at elevated temperatures. Still other additives are employed to impart chemical stability to the latex in order to preserve, aid handling and storage and control coagulation. Chemical stability has been imparted to natural rubber latex by the addition of various surfactants and emulsifiers.

U.S. Pat. No. 3,006,872 discloses a method for heat-sensitizing natural rubber latex compositions by the addition of poly(ethylene oxide) which allows the latex to coagulate in or on hot mold surfaces thereby providing reduced chemical stability. Further disclosed is the use of alkylphenoxy polyoxyethylene ethanols as stabilizing agents to prevent coagulation of the latex upon the addition of acid thereby increasing mechanical stability.

U.S. Pat. No. 3,878,152 discloses a process for heat-sensitizing anionic and nonionic aqueous polymer dispersions, including both natural and synthetic rubber latexes, by the addition of alkoxylated amines of inverse solubility provided polyalkylene oxides of inverse solubility are also present and the pH of the dispersion is below 6. The patentees further state that the polymer dispersions stabilized in this manner are sufficiently stable to withstand shear forces during processing. Thus, chemical stability was reduced while mechanical stability was not.

Australian Pat. No. 146,350 discloses a process for softening natural rubber by heating an acid aqueous dispersion thereof containing a compound having an oxygen-oxygen bridge, in lieu of hydrogen peroxide, and a nonionic stabilizer, such as a polyethylene glycol ether, the latter being added prior to heating to render the dispersion stable under acid conditions and to prevent gelation.

These patents and others of which the foregoing are typical do not address the matter of reducing the mechanical stability of natural rubber latex merely by the use of nonionic surfactants. Controlling chemical stability is, however, sought and in most instances it is reduced. As is known to those skilled in the art, chemical stability can be reduced by the addition of various compounds but not without an accompanying increase in mechanical stability. To be useful in the quick-break adhesive art, it is desirable that the mechanical stability of natural rubber latex be reduced, allowing the latex to be made sensitive to pressure and/or shear and enabling it to be transformed from a colloidal liquid to a coherent film.

DISCLOSURE OF THE INVENTION

It is therefore an object of the present invention to provide a method for reducing the mechanical stability of natural rubber latex.

It is another object of the present invention to provide a method for reducing the mechanical stability of natural rubber latex so as to improve the properties of the latex when utilized as a quick-break adhesive or caulking compound.

It is yet another object of the present invention to provide a method for reducing the mechanical stability of natural rubber latex by the addition of a nonionic polyol block copolymer surfactant.

These and other objects, together with the advantages thereof over existing methods for stabilizing natural rubber latex, which shall become apparent from the specification which follows, are accomplished by the invention as hereinafter described and claimed.

In general the method of the present invention is practiced by the step of adding a nonionic polyol block copolymer surfactant to the natural rubber latex in an amount of from about 0.1 to about 0.5 parts per hundred of rubber based upon the weight of the rubber. The polyol surfactants preferred include block copolymers of poly(oxyethylene) and poly(oxypropylene).

PREFERRED MODE FOR CARRYING OUT THE INVENTION

The basic latex adhesive composition comprises up to about 62% total solids natural rubber latex concentrate. The natural rubber latex employed is a low ammonia type, wherein the ammonia does not exceed 1.0 percent of the latex, and is preferred to high ammonia types in order to reduce the amount of ammonia fumes during compounding and processing. Nevertheless, the present invention can be practiced with high ammonia types of latex. Particularly useful low ammonia natural rubber latexes include Hartex 101, 102 and 103. Typical physical properties of the low ammonia Hartexes are listed in Table I. Hartex is a registered trademark of The Firestone Tire and Rubber Co., the Assignee of record herein.

TABLE I
Typical Physical Property Ranges of Hartex Natural Rubber Latex Types

|  | Low Ammonia Types | High Ammonia Types |
|---|---|---|
| Total Solids | 62.1 ± 0.3 | 62.1 ± 0.3 or 67.5 ± 0.5 |
| NH$_3$% on latex | 0.15–0.23 | 0.67–0.75 |
| Mechanical Stability at 55%, sec | 1650 ± 550 | 1250 ± 350 |
| KOH No. | 0.48–0.70 | 0.40–0.60 |
| VFA No.$^a$ | 0.05 max. | 0.05 max. |
| pH | 9.6 ± 0.3 | 10.4 ± 0.2 |

$^a$volume fatty acid

In order to reduce the mechanical stability of the natural rubber latex, a nonionic surfactant is added. The preferred surfactants employed are polyols, that is, poly(oxyethylene)-poly(oxypropylene) block copolymers having cloud points of less than 100° C. and preferably between 15° to 30° C. Such polyol surfactants include block polymers of propylene oxide (PO) sandwiched between two block polymers of ethylene oxide (EO), designated as EO-PO-EO; reverse structures designated as PO-EO-PO; block copolymers of EO-PO bonded to ethylenediamine; and block copolymers of PO-EO bonded to ethylenediamine.

Surfactants of the first type are commercially available under the name Pluronic. The Pluronic polyols are available as liquids, pastes, prills and cast solids. Those particularly useful are the liquids and include the following series: L61, L72, L81, L92, L101, L121 and L122. Typical molecular weight of the PO block ranges from 1750 to 4000, the PO block comprising from about 80 to 90 weight percent of the block copolymer. Physical properties appear in Table II.

TABLE II
Typical Properties of Pluronic Polyols

| Series | Form | Ave. M.W. | Brookfield Viscosity (cps) at 25° C. | Cloud Point °C. 1% Aqueous |
|---|---|---|---|---|
| L61 | L | 2000 | 285 | 24 |
| L72 | L | 2750 | 510 | 25 |
| L81 | L | 2750 | 475 | 20 |
| L92 | L | 3650 | 700 | 26 |
| L101 | L | 3800 | 800 | 15 |
| L121 | L | 4400 | 1200 | 14 |
| L122 | L | 5000 | 1750 | 19 |

Surfactants of the second type are commercially available as the Pluronic R polyols, for reverse Pluronic wherein the EO block is at the center. These surfactants are also available in liquid, paste and solid forms with the liquid of the following series being particularly useful: 17R1, 25R1, 25R2, 31R1 and 31R2. Also useful is a paste 31R4. Typical molecular weight of the propylene portion ranges from 1700 to 3100, the PO portion comprising from about 60 to 90 weight percent of the block copolymer. Physical properties appear in Table III.

TABLE III
Typical Properties of Pluronic R Polyols

| Series | Form | Ave. M.W. | Brookfield Viscosity (cps) at 25° C. | Cloud Point °C. 1% Aqueous |
|---|---|---|---|---|
| 17R1 | L | 1950 | 300 | 32 |
| 25R1 | L | 2800 | 460 | 28 |
| 25R2 | L | 3120 | 680 | 33 |
| 31R1 | L | 3200 | 578 | 25 |
| 31R2 | L | 3400 | 818 | 30 |
| 31R4 | P | 4300 | — | 31 |

Surfactants of the third type are commercially available as the Tetronic polyols comprising four EO-PO diblocks linked to a molecule such as ethylenediamine, the PO blocks being bonded to the nitrogen atoms. Forms include liquids, pastes and solids and, again, the liquids are preferred, particularly the following series: 701, 702, 901, 1101, 1102, 1301, 1302, 1501 and 1502. The polypropylene portion of these surfactants have molecular weights ranging from 2500 to 7000 which portion accounts for 80 to 90 weight percent of the molecule. Physical properties appear in Table IV.

TABLE IV
Typical Properties of Tetronic Polyols

| Series | Form | Ave. M.W. | Brookfield Viscosity (cps) at 25° C. | Cloud Point °C. 1% Aqueous |
|---|---|---|---|---|
| 701 | L | 3400 | 575 | 22 |
| 702 | L | 4000 | 770 | 27 |
| 901 | L | 4750 | 700 | 20 |
| 1101 | L | 5600 | 700 | 17 |
| 1102 | L | 6300 | 820 | 31 |
| 1301 | L | 6800 | 1000 | 16 |
| 1302 | L | 7800 | 1300 | 20 |
| 1501 | L | 7900 | 1170 | 15 |
| 1502 | L | 9000 | 1570 | 70 |

Lastly, the fourth type of surfactant is commercially available as the Tetronic R polyol series, or reverse Tetronic, wherein the EO blocks of the four PO-EO diblocks are bonded to the nitrogen atoms. These surfactants are also available in the three forms, with the liquids being preferred, and include the following series: 70R1, 70R2, 90R1, 110R1, 110R2, 130R1, 130R2 and 150R1. At least one paste, 150R4, can also be employed. The polypropylene portion of these surfactants have molecular weights ranging from 2500 to 7000 which portion accounts for 60 to 90 weight percent of the molecule. Physical properties appear in Table V.

TABLE V
Typical Properties of Tetronic R Polyols

| Series | Form | Ave. M.W. | Brookfield Viscosity (cps) at 25° C. | Cloud Point °C. 1% Aqueous |
|---|---|---|---|---|
| 70R1 | L | 3400 | 800 | 25 |
| 70R2 | L | 4000 | 884 | 31 |
| 90R1 | L | 4750 | 945 | 21 |
| 110R1 | L | 5600 | 1000 | 21 |
| 110R2 | L | 6300 | 1320 | 27 |
| 130R1 | L | 6800 | 1240 | 20 |
| 130R2 | L | 7800 | 1880 | 25 |

TABLE V-continued

Typical Properties of Tetronic R Polyols

| Series | Form | Ave. M.W. | Brookfield Viscosity (cps) at 25° C. | Cloud Point °C. 1% Aqueous |
|---|---|---|---|---|
| 150R1 | L | 7900 | 1840 | 20 |
| 150R2 | P | 9000 | — | 25 |

Pluronic and Tetronic are both registered trademarks of Wyandotte Chemicals Corporation and the surfactants are commercially available from BASF Wyandotte Corporation. The amount of surfactant employed ranges from about 0.1 to about 0.5 parts per hundred parts of rubber (phr). Practice of the invention, according to the preferred method herein, is by the addition of the nonionic surfactant polyol directly to the latex emulsion. The surfactants listed herein are all 100% active and may be added in that form; however, dilution to 25% activity with water is sometimes desirable in order to facilitate dispersion and mixing into the latex.

In addition to the natural rubber latex aqueous emulsion and the polyol surfactant, the latex composition can also contain other ingredients commonly employed in latex adhesive formulations which could include antioxidants, tackifying resins and the like.

In order to demonstrate usefulness of the present invention, three surfactants disclosed herein, Pluronic L101, Tetronic 702 and Tetronic 901, were added to natural rubber latex in quantities of 0.1, 0.3 and 0.5 phr. A control was also provided wherein no surfactant was present. Mechanical stability was determined according to ASTM D1076-78 Section 16(2), chemical stability was determined according to Dawson's zinc oxide viscosity (ZOV) test and viscosity was determined with a Brookfield LVF Viscometer, #1 spindle, operating at 60 rpm and at 23° C. Viscosity was measured initially and at three subsequent one week intervals. A lowering of mechanical stability is seen as the time in seconds decreases.

Natural rubber latex, employed in the control and examples 1–9 reported in Table VI, was Hartex 103 at 62.6% total solids content.

the present invention is operable to lower the mechanical stability of natural rubber latex. As stated hereinabove, by lowering the mechanical stability, better quick-grab adhesives are obtained.

As will be apparent to those skilled in the art, not only the nonionic surfactants disclosed herein are operable in the practice of the present invention but also other nonionic polyol block copolymer surfactants having similar physical properties can be employed. Moreover it should be evident that the amount of surfactants employed can be determined without departing from the spirit of the invention herein disclosed and described, and that the scope of the invention shall include all modifications and variations that fall within the scope of the attached claims. Thus, it can be seen that the disclosed invention carries out the objects of the invention set forth hereinabove.

I claim:

1. A method for reducing the mechanical and chemical stability of natural rubber latex comprising the step of:

adding to the latex a nonionic polyol block copolymer surfactant selected from the group consisting of block polymers of propylene oxide sandwiched between block polymers of ethylene oxide in an amount of about 0.5 parts per 100 parts of rubber and block copolymers of ethylene oxide and propylene oxide bonded to ethylenediamine in an amount of from about 0.1 to about 0.5 parts, per 100 parts of rubber, and having a cloud point of less than 100° C., in order to reduce the amount of pressure necessary for the latex to bond to substances upon which it is applied.

2. A method for reducing the mechanical and chemical stability of natural rubber latex comprising the step of:

adding to the latex about 0.5 part, per 100 parts of rubber, of a nonionic polyol block copolymer surfactant comprising poly(oxyethylene-b-oxypropylene-b-oxyethylene), having an average molecular weight of 3800 and a cloud point of 15° C.

3. A method for reducing the mechanical and chemical stability of natural rubber latex comprising the step of:

TABLE VI

Effect of Surfactant on Mechanical and Chemical Stability

| | Control | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Surfactant and amount added (phr) | 0 | 0.1 Pluronic L101 | 0.3 Pluronic L101 | 0.5 Pluronic L101 | 0.1 Tetronic 702 | 0.3 Tetronic 702 | 0.5 Tetronic 702 | 0.1 Tetronic 901 | 0.3 Tetronic 901 | 0.5 Tetronic 901 |
| Mechanical Stability (seconds) | 1135 | 1240 | 1180 | 740 | 1000 | 965 | 1090 | 1050 | 675 | 550 |
| ZOV (cps) at 55% T.S. | | | | | | | | | | |
| Initial | 46 | 48 | 54 | 57 | 46 | 48 | 50 | 48 | 54 | 56 |
| 3' | 50 | 57 | 87 | 126 | 50 | 54 | 59 | 55 | 80 | 96 |
| 5' | 62 | 75 | 118 | 199 | 59 | 68 | 74 | 69 | 108 | 146 |
| 24 hrs. | | Coag. | Coag. | Coag. | Coag. | Coag. | Coag. | Coag. | Coag. | Coag. |
| Brookfield Viscosity at 62.6% T.S. | | | | | | | | | | |
| Initial | 93.3 | 119 | 156 | 216 | 114 | 136 | 146 | 117 | 150 | 204 |
| 1 Week | | 130 | 196 | 344 | 117 | 155 | 200 | 121 | 183 | 333 |
| 2 Weeks | | 128 | 197 | 381 | 117 | 163 | 233 | 122 | 196 | 398 |
| 3 Weeks | | 130 | 202 | 390 | 120 | 189 | 246 | 124 | 205 | 442 |

As can be seen in Table VI mechanical stability generally decreased as the amount of nonionic polyol block copolymer surfactant increased. Based upon the results reported in Table VI, it can be seen that the method of of:

adding to the latex from about 0.1 to about 0.5 parts, per 100 parts of rubber, of a nonionic polyol block copolymer surfactant comprising four poly(oxyethylene-b-oxypropylene) copolymers bonded to the nitrogen atoms of ethylenediamine via said polypropylene blocks, having an average molecular weight of 4000 and a cloud point of 27° C.

4. A method for reducing the mechanical and chemical stability of natural rubber latex comprising the step of:

adding to the latex from about 0.1 to about 0.5 parts, per 100 parts of rubber, of a nonionic polyol block copolymer surfactant comprising four poly(oxyethylene-b-oxypropylene) copolymers bonded to the nitrogen atoms of ethylenediamine via said polypropylene blocks, having an average molecular weight of 4750 and a cloud point of 20° C.

* * * * *